United States Patent [19]

Berfield

[11] Patent Number: 4,621,849

[45] Date of Patent: Nov. 11, 1986

[54] BUMPER FOR WHEEL WELL

[75] Inventor: Robert C. Berfield, Jersey Shore, Pa.

[73] Assignee: Shop-Vac Corporation, Williamsport, Pa.

[21] Appl. No.: 670,068

[22] Filed: Nov. 13, 1984

[51] Int. Cl.⁴ ............... B60R 19/24; B60R 19/30
[52] U.S. Cl. .................. 293/155; 293/102; 293/136; 267/140; 16/18 CG; 16/39
[58] Field of Search ............ 293/1, 102, 108, 128, 293/136, 142, 155; 267/116, 140; D8/375; 16/18 CG, 39, 31 R, 43

[56] References Cited

U.S. PATENT DOCUMENTS

| D. 169,564 | 5/1953 | Schultz, Jr. | D8/375 |
| 2,129,579 | 9/1938 | Herold | 16/18 CG |
| 2,798,756 | 7/1957 | Corydon, II | 293/108 |
| 3,166,780 | 1/1965 | Schultz, Jr. | 16/21 |
| 4,399,586 | 8/1983 | McCarroll | 16/31 R |

Primary Examiner—Robert B. Reeves
Assistant Examiner—Dennis H. Pedder
Attorney, Agent, or Firm—Ostrolenk, Faber, Gerb & Soffen

[57] ABSTRACT

A bumper for the wheel well of a dolly or cart consists of a single element molded of flexible plastic material to include a cap, a lock and a hinge connecting the cap to the lock. The wheel well is adapted to receive a swivel shaft that extends through an aligned aperture in the cap to limit movement of the bumper. Further, movement of the bumper is also restricted by cooperation of the lock and the mounting bracket of which the wheel well is a part. The hinge permits the lock to be reversely bent from a first position in which the bumper is molded to a second position where the lock is captured between the wheel well and ears of the bracket that mounts the wheel well to the cart.

16 Claims, 9 Drawing Figures

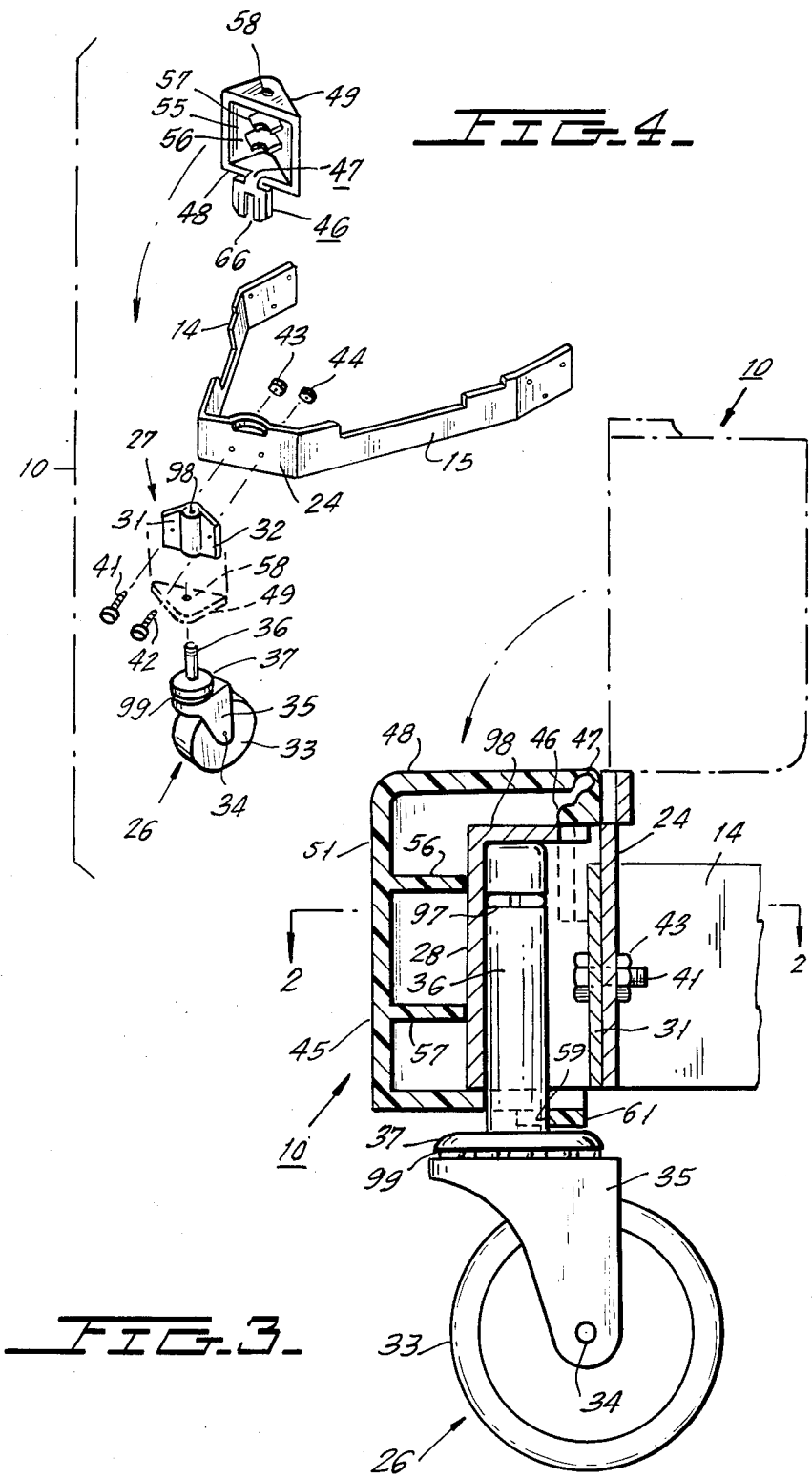

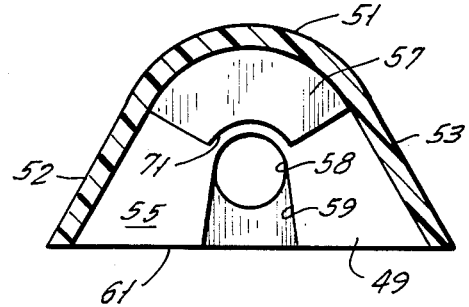
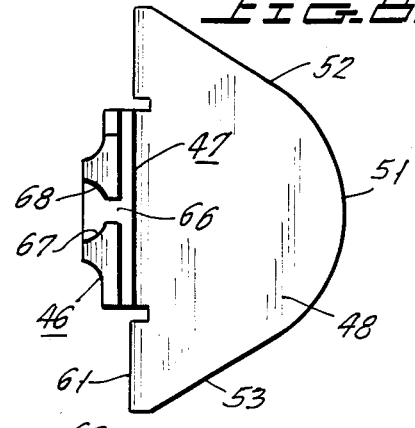
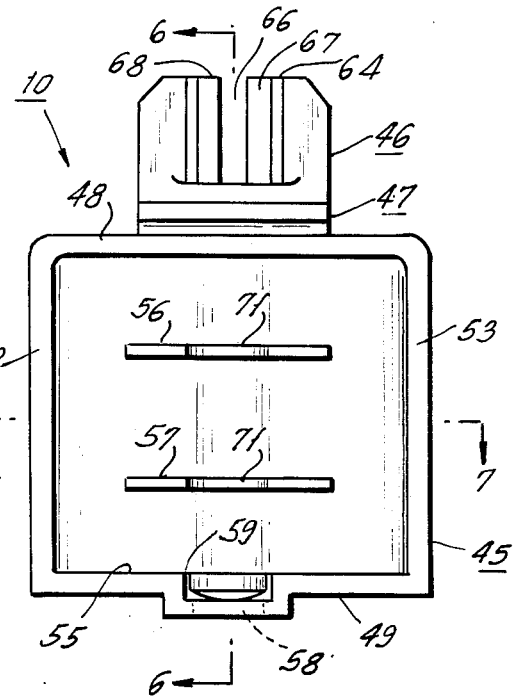
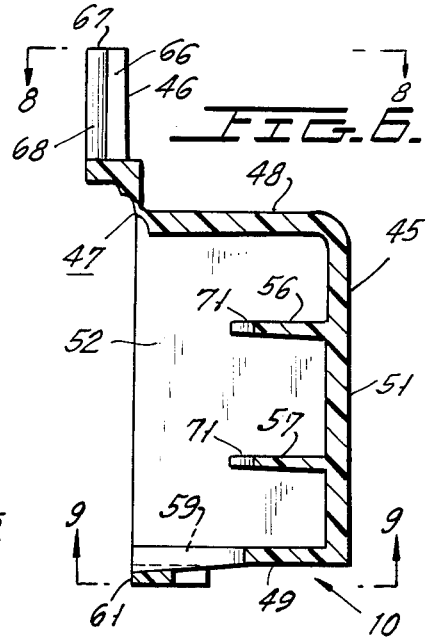
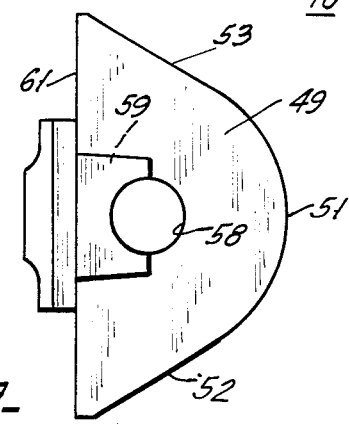

BUMPER FOR WHEEL WELL

BACKGROUND OF THE INVENTION

This invention relates to resilient bumpers in general, and more particularly relates to bumper of this type adapted for dollies or hand carts.

To facilitate moving moderately heavy or awkward to hold objects, various types of hand carts are utilized. Usually, at least one wheel of such a cart is part of a swivel type caster assembly and is attached to the cart frame at a corner thereof. These carts are often used indoors where conditions are crowded so that it is not unusual for a caster assembly to collide with furniture and/or walls.

To limit damage or prevent same during these collisions, the prior art has provided resilient bumpers that are mounted to the carts in the vicinity of the caster assembly. Such bumpers have added materially to the costs of the carts since the bumpers were costly to produce and/or to install. Further, for secure installations, tools had to be utilized.

SUMMARY OF THE INVENTION

In order to eliminate the aforesaid problems of prior art bumpers for hand carts having swivel type caster assemblies, the instant invention provides a novel single molded plastic bumper element that is readily installed and replaced without utilizing tools, yet is securely mounted in its installed position. More particularly, the single piece bumper constructed in accordance with the instant invention includes a cap and a tab constituting lock that is connected to the cap by a hinge formed integrally therewith. The cap is open at the rear thereof and forms a chamber which receives a tubular cylindrical part that defines an elongated well for the swivel shaft of the caster assembly. The lock is captured between the cylindrical part and ears that secure the bracket section of the caster assembly to the frame of the cart.

The cap includes a bottom wall having an aperture that is in alignment with the entrance to the well. The swivel shaft of the caster assembly extends through this aperture and prevents the bottom of the cap from being pivoted away from the caster assembly. The captured lock prevents the upper end of the assembly from moving horizontally away from the caster assembly and the upward and downward movement of the cap is prevented by positioning the bottom wall of the cap between the clevis of the caster assembly wheel section and the bottom of the bracket section's cylindrical part. Merely separating the wheel and bracket sections of the caster assembly by withdrawing the swivel shaft from its well enables a worn bumper to be removed.

Accordingly, the primary object of the instant invention is to provide a cart bumper that is relatively inexpensive to manufacture and install.

Another object is to provide a bumper of this type that is a single piece element molded of plastic material.

Another object is to provide a bumper of this type that has effective shock absorbing qualities.

A further object is to provide a bumper of this type that does not require tools for either installation or removal.

A still further object is to provide a bumper of this type that is easily and securely fastened in operative position.

BRIEF DESCRIPTION OF THE DRAWINGS

These objects, as well as other objects of this invention, shall become readily apparent after reading the following description of the accompanying drawings in which:

FIG. 3 is a fragmentary cross-section taken through line 3—3 of FIG. 1 looking in the direction of arrows 3—3.

FIG. 4 is an exploded perspective of the bumper and caster assembly together with the cart frame section to which the caster assembly is secured.

FIG. 5 is a rear view of the bumper unit as it is removed from the mold for constructing same.

FIG. 6 is a cross-section taken through lines 6—6 of FIG. 5 looking in the direction of arrows 6—6.

FIG. 7 is a cross-section taken through lines 7—7 of FIG. 5 looking in the direction of arrows 7—7.

FIG. 8 is a top plan view of the bumper unit looking in the direction of arrows 8—8 of FIG. 6.

FIG. 9 is a bottom view of the bumper unit looking in the direction of arrows 9—9 of FIG. 6.

DETAILED DESCRIPTION OF THE DRAWINGS

Figure 1:
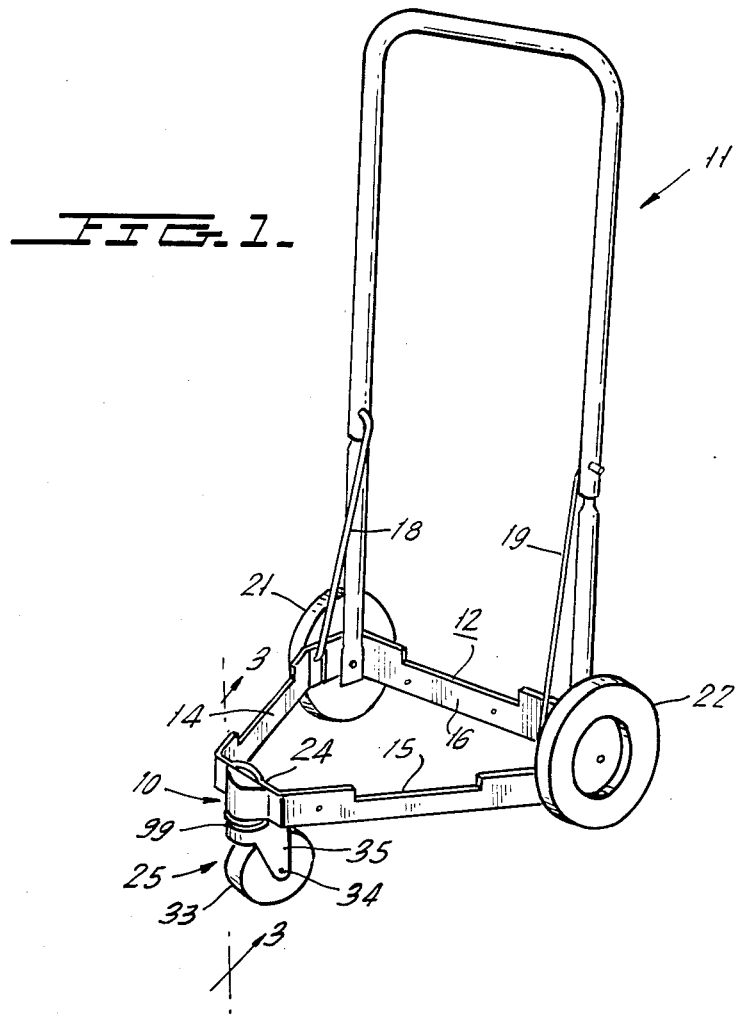
FIG. 1 is a perspective of a three-wheeled hand cart that includes a bumper unit constructed in accordance with teachings of the instant invention.

Now referring to the figures and initially looking more particularly at FIG. 1 which illustrates bumper unit 10 constructed in accordance with teaching of the instant invention mounted to hand cart 11. The latter includes generally triangular horizontal load support frame 12 including legs 14, 15, 16 and inverted U-shaped handle connected to frame 12 at opposite ends of leg 16. Rods 18, 19 stabilize the parallel arms of handle 17 in their extended positions shown in FIG. 1.

Figure 2:
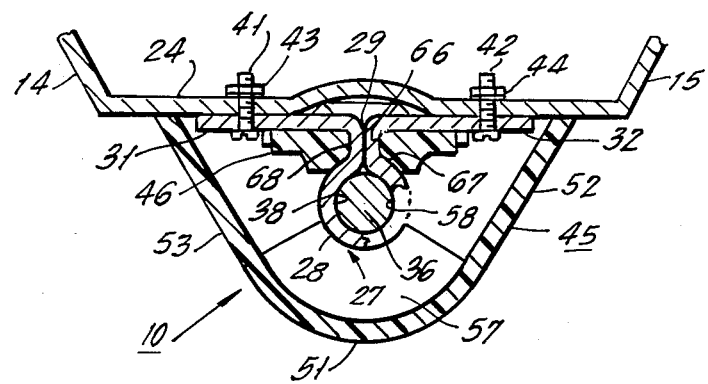
FIG. 2 is a cross-section taken through the line 2—2 of FIG. 3 looking in the direction of arrows 2—2.

Relatively large wheels 21, 22 are rotatably connected to frame 12 at opposite ends of leg 16 while swivel type caster assembly 25 is mounted to frame 12 at short frame portion 24 that connects legs 14 and 15. Caster assembly 25 is of conventional construction and includes wheel section 26 that is removably connected to bracket section 27. As seen best in FIG. 2, the latter extends forward from frame portion 24 and includes tubular cylinder 28, connecting section 29 extending radially rearward from cylinder 28, and mounting ears 31, 32 that lie in a common vertical plane and extend in opposite directions from connecting section 29. Wheel section 26 includes relatively small diameter wheel 33 mounted on horizontal axle 34 that extends between the spaced legs of clevis 35, vertical swivel shaft 36 extending upwardly from the web of clevis 35, and bearing 99 that is interposed between clevis 35 and the concave underside of disk 37 secured to the lower end of shaft 36. Swivel shaft 36 is removably inserted in well 38 defined by tube 28 with compressed split ring 97 mounted on shaft 36 engaging the inner surface of tube 28 to frictionally retain wheel section 26 connected to bracket section 27. With shaft 36 fully inserted in well 38, the upper end of the former engages the closed upper end 98 of the tube 28.

Screws 41, 42 extend through aligned clearance apertures in ears 31, 32 and in frame portion 24, and are threadably engaged by the respective nuts 43, 44 to fixedly secure bracket section 27 of caster assembly 25 to frame 25 of cart 11.

Bumper unit 10 is a single element molded of a flexible plastic material, typically low density polyethylene, and includes cap 45, a tab constituting lock 46, and hinge 47 interposed between cap 45 and lock 46. FIGS. 5–9 illustrate bumper unit 10 as it is removed from the mold (not shown) used to form unit 10. That is, at that time lock 46 extends upward from upper wall 48 of cap 45. Cap 45 also includes lower wall 49 at a lower side of the cap, arcuate front wall 51 extending between upper and lower walls 48, 49, and diverging side walls 52, 53 extending rearward from opposite ends of front wall 51. Upper wall 48 is at an upper side of cap 45. Side walls 52, 53 also extend between upper and lower walls 48, 49. Walls 48, 49, 51, 52 and 53 define chamber 55 that has a rectangular opening at the rear thereof.

Vertically spaced horizontal ribs 56, 57 constitute shock absorbers that are disposed within chamber 55 and extend rearward from front wall 51. For a reason to be hereinafter explained, bottom wall 49 is provided with circular aperture 58 and with depressed portion 59 that extends from rear edge 61 of cap 45 to the center of aperture 58 (see FIGS. 7 and 9). Lock 46 includes free edge 64 that is generally parallel to and remote from hinge 47. Slot 66 extends through lock 46 from edge 64 almost to hinge 47. The portions of lock 46 on opposite sides of slot 66 are provided with facing arcuate surfaces 67, 68 that are formed about a common center and are of generally the same radius as the outer surface of cylinder 28.

Bumper unit 10 is mounted to cart 11 by holding lock 46 and cap 45 in the relative position illustrated in FIGS. 5–9 and inserting lock 46 downward between tube 28 and ears 31–32, with slot 66 receiving connecting section 29. As this takes place, edge 64 faces downward and arcuate surfaces 67, 68 face tube 28.

Lock 46 has another surface opposite its arcuate surface which is best seen when lock 46 is in its second position. The other surface is adapted to be positioned adjacent mounting ear formations that extend from a connecting extension projecting radially from the structure that defines a swivel shaft receiving well when the latter is operatively disposed within the chamber of lock 46. Thereafter, cap 45 is pivoted downward through 180° to the position illustrated in FIG. 3. The end portion of this movement is guided through cooperation between depression 59 and the lower end of tube 28, and ends when aperture 58 becomes aligned with well 38. Thereafter, swivel shaft 36 is inserted into well 38 and in this position shaft 36 prevents cap 45 from pivoting upward about hinge 47 as a center. To dismount bumper unit 10, the previous steps are followed in reverse. The rearwardly facing arcuate notches 71 in shock absorber ribs 56, 57 provide clearance for tube 28 yet provide extensive surface area for engagement between ribs 56, 57 and tube 28 when there is a collision between front wall 51 and another object.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A bumper unit constructed as a single molded plastic element and including:

a cap having a lower side, an upper side, and a rear side and defining a chamber having an opening at the rear side of said cap; a lock at the upper side of the cap extending generally away from the cap; and a hinge interposed between said cap and said lock;

said chamber being adapted to receive a protruding bracket section of a swivel type caster assembly, said bracket section being insertable into said chamber through said opening;

means for securing said lock to said assembly;

said hinge defining a center about which said cap is pivotable relative to said lock from a first position wherein said unit is formed and at which said first position the lock extends away from said cap, to a second position; and, when in said second position, said lock being located at said rear side of said cap, in registration with said opening.

2. A bumper unit as set forth in claim 1 in which there is relative movement of approximately 180° between said cap and said lock as the latter changes location between said first and second positions.

3. A bumper unit as set forth in claim 1 in which the cap includes an upper wall and a lower wall; said hinge being disposed at said upper wall at the rear thereof; said lower wall having an aperture adapted to receive a vertically extending swivel shaft of said caster assembly.

4. A bumper unit as set forth in claim 3 in which the upper and lower walls are connected by a front wall means; said bumper unit also including a shock absorber formation extending generally rearward from said front wall means and disposed within said chamber.

5. A bumper unit as set forth in claim 4 in which the front wall means is arcuate in horizontal cross-section.

6. A bumper unit as set forth in claim 5 in which the cap also includes diverging side walls that extend rearwardly from opposite ends of the front wall means.

7. A bumper unit as set forth in claim 4 in which the shock absorber formation includes a plurality of ribs.

8. A bumper unit as set forth in claim 4 in which the shock absorber formation includes a plurality of vertically spaced horizontal ribs.

9. A bumper unit as set forth in claim 8 in which the front wall means is arcuate in horizontal cross-section.

10. A bumper unit as set forth in claim 9 in which the cap also includes diverging side walls that extend rearwardly from opposite sides of the front wall means.

11. A bumper unit as set forth in claim 3 in which the hinge is connected to the lock along one edge of the latter; said lock including a slot extending to a second edge of said lock opposite said first edge thereof, with said hinge horizontal and said lock being in said second position said slot being vertical, said slot being adapted to receive a connecting extension projecting radially from means defining a swivel shaft receiving well operatively disposed within said chamber.

12. A bumper unit as set forth in claim 11 in which the slot is vertical and with the lock in its said second position, said second edge of said lock being below said hinge.

13. A bumper unit as set forth in claim 12 in which said lock in horizontal cross-section includes an arcuate surface interrupted by said slot and said arcuate surface is adapted to be positioned adjacent an exterior surface of means defining a swivel shaft receiving well operatively disposed within said chamber.

14. A bumper unit as set forth in claim 13 in which said lock when in said second position having another surface opposite said arcuate surface, said another surface being adapted to be positioned adjacent mounting ear formations that extend from a connecting extension projecting radially from means defining a swivel shaft receiving well when the latter is operatively disposed with said chamber.

15. A bumper unit as set forth in claim 4 in which the hinge is connected to the lock along one edge of said lock; said lock including slot extending to a second edge of said lock opposite said first edge thereof, with said hinge horizontal and said lock being in said second position said slot being vertical, said slot being adapted to receive a connecting extension projecting radially from means defining a swivel shaft receiving well operatively disposed within said chamber.

16. A bumper unit as set forth in claim 15 in which the shock absorber formation includes a plurality of vertically spaced horizontal ribs.

* * * * *